United States Patent [19]

Schriever

[11] 3,749,537

[45] July 31, 1973

[54] MOLD BASE FOR INJECTION MOLDING APPARATUS

[75] Inventor: Ferdinand J. Schriever, Monroe, Conn.

[73] Assignee: Schriever Design Co., Inc., Shelton, Conn.

[22] Filed: June 4, 1971

[21] Appl. No.: 149,958

[52] U.S. Cl. .................. 425/242, 425/436, 425/444, 425/450

[51] Int. Cl. ............................ B29f 1/12, B29f 1/14

[58] Field of Search .................... 425/182, 186, 436, 425/444, 450, 451, 247, 242; 249/205, 66–69, 76

[56] References Cited

UNITED STATES PATENTS

| | | | |
|---|---|---|---|
| 2,398,893 | 4/1946 | Quarnstrom | 249/68 |
| 3,068,520 | 12/1962 | Hehl | 425/247 X |
| 3,373,459 | 3/1968 | Hehl | 425/450 X |
| 3,044,121 | 7/1962 | Wiskoff et al. | 249/68 |
| 3,433,450 | 3/1969 | Brunner et al. | 249/67 |
| 3,394,434 | 7/1968 | Hart-Still | 425/242 X |

FOREIGN PATENTS OR APPLICATIONS

| | | | |
|---|---|---|---|
| 1,265,390 | 4/1968 | Germany | 425/182 |

*Primary Examiner*—J. Spencer Overholser
*Assistant Examiner*—Michael O. Sutton
*Attorney*—Spencer & Kaye

[57] ABSTRACT

A mold base for injection and other types of molding apparatus including mold plates, ejector plates and end plates, in which the ejector plates include a body portion and a plurality of tabs extending one from each side of the body portion and each extending between different pairs of sleeves which are situated in assembly to separate the mold plates from the end plates.

4 Claims, 4 Drawing Figures

FIG. 1
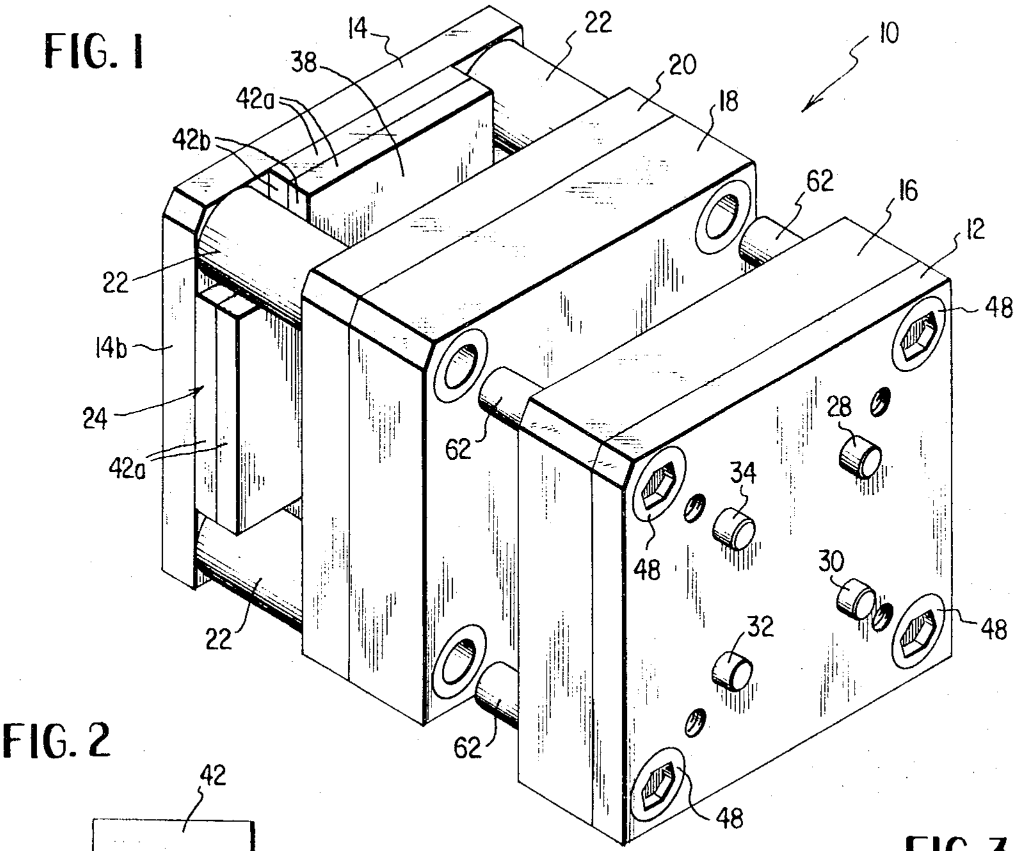
FIG. 2
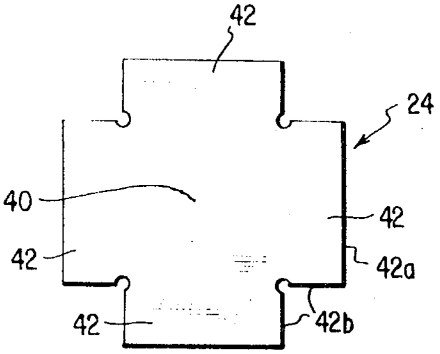
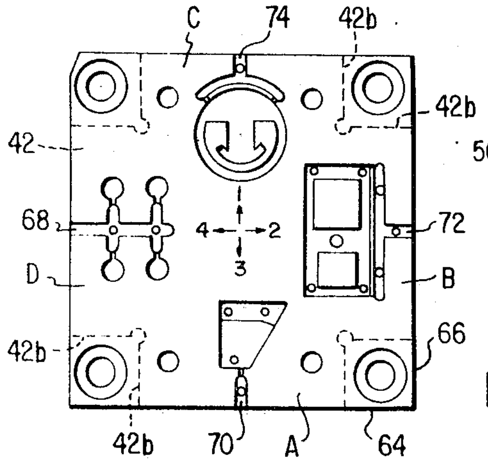
FIG. 4
FIG. 3
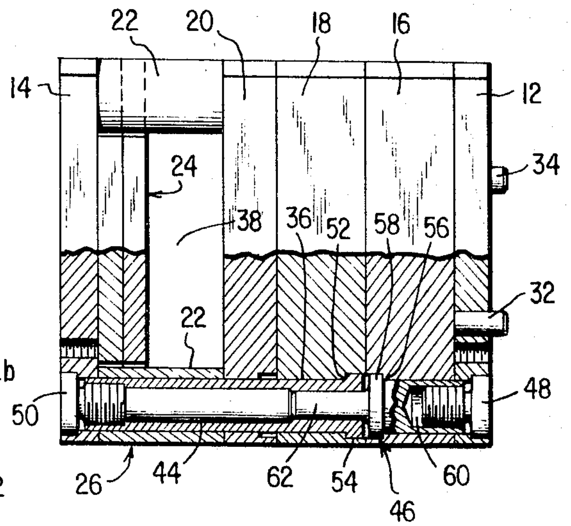
INVENTOR
FERDINAND J. SCHRIEVER
BY *Spencer & Kaye*
ATTORNEYS.

MOLD BASE FOR INJECTION MOLDING APPARATUS

BACKGROUND OF THE INVENTION

The invention relates to a mold base for injection and other types molding machines and more particularly to an optimized mold base which utilizes substantially all the available volume of the mold plates and a significantly increased ejector plate surface area in conjunction therewith.

In the highly competitive injection molding industry, as in many other industries, cost is of paramount importance. One of the major cost factors is, of course, the mold base itself. These devices are expensive to purchase because they fall into the category of high precision devices. The quality of the mold base and consequently the mold made therefrom is directly proportional to the purchase price.

It would, therefore, be desirable to have a mold base which can be used with existing injection molding machines and which would be more flexible in its design so that it would not be necessary to sacrifice quality for price.

To this end, the mold base of the present invention provides such a flexible design by more efficiently utilizing the space available in existing mold base designs. This is accomplished without sacrificing the vital factor of precision.

The mold base of the present invention is similar in certain respects to that used in the "Arburg Allrounder 150" injection molding machine, which is manufactured by Arburg Maschinenfabrik Hehl & Sohne o.H.G., Lossburg, Germany.

In this machine, only a single mold cavity or only a single set of cavities, is included in the mold base and the ejector plates are rectangular when viewed in plan and possess a smaller surface area than do the mold plates. Heretofore, the art, as represented by the above-identified injection molding machine, has failed to realize how to more effectively utilize existing designs to render them more flexible and efficient while not sacrificing precision and therefore quality control of the molds manufactured.

Notwithstanding the fact that the problem presented is one of long standing and that a significant amount of time is expended in researching for a solution, none of the mold bases available today possess the flexibility or approach the solution of the problem to the same degree as found in the present invention.

It is, therefore, a general object of the present invention to provide a mold base for an injection molding machine which is more flexible and more efficiently utilizes available space for mold cavities than has heretofore been known.

It is a particular object of the present invention to provide a mold base for an injection molding machine which includes four mold cavities or four sets of mold cavities, and is readily adaptable so that either mold cavity can be positioned for use with respect to the injection molding machine.

It is another particular object of the present invention to provide a mold base for an injection molding machine which includes a sleeve confined to the region of each of the four corners between the mold plates and one end plate, so that the ejector plate can occupy substantially the entire surface area left unoccupied by the sleeves.

It is still another particular object of the present invention to provide a mold base for an injection molding machine in which a plurality of studs extending from the other end plate are utilized for positioning the mold base to one side of the injection molding machine.

These and other objects of the present invention are realized by a mold base which exhibits significant flexibility by the provision of square coacting mold plates including a plurality of mold cavities with their respective ingates extending to a different one of the four edges of the mold plates, so that the mold base may be readily positioned with respect to the injection molding machine in any one of four positions for utilizing any one of the four mold cavities; and four aligning subassemblies arranged to extend through the entire length of the mold base only in the corner regions thereof, for aligning said plates, thereby freeing substantially the entire remainder of the surface area defined by these square plates so that the ejector plate means, which is arranged in the space between the set of mold plates and one end plate, can occupy substantially the entire surface area defined by the square plates and left unoccupied by the aligning subassemblies.

BRIEF DESCRIPTION OF THE DRAWINGS

FIG. 1 is a partly exploded perspective view of the mold base of the present invention showing the ejector plate, its cooperation with the aligning subassemblies and the locating studs which engage the mold base to one side of the injection molding machine.

FIG. 2 shows a plan view of the ejector plate.

FIG. 3 is a view partly in cross section showing the alignment subassembly utilized in the present invention.

FIG. 4 shows in plan view a typical mold cavity pattern which can be achieved by the mold base of the present invention.

DESCRIPTION OF THE PREFERRED EMBODIMENT

Referring now to the drawings in which like numerals are used to indicate like parts throughout the various views thereof, FIG. 1 shows a partial, exploded view in perspective of a mold base 10. The mold base 10 can be seen to comprise a pair of end plates 12 and 14, a mold plate 16, a core plate 18, a core back-up plate 20, four ejector pillars or sleeves 22, a pair of ejector plates 24 and four securing and aligning subassemblies 26.

All of the plates are configured to have a square surface area, so that the mold base can be assembled to an injection molding machine by positioning the mold base along either one of its four edges. In this regard, the end plate 12 is provided with four locating studs 28, 30, 32 and 34. These studs are of equal diameter and are positioned such that each stud is equidistant from the next two adjacent studs. That is, the stud 28 is equidistantly spaced from the studs 30 and 34. The studs, therefore, form a circular outline which readily fits the conventional locating ring of an injection molding machine in either position of the mold base 10.

Each plate of the mold base 10 is provided at each of its four corners with a bore 36 through which the securing and aligning subassemblies 26 are inserted. The bores 36 are of equal diameter, so that the securing and aligning subassemblies 26 are readily interchangeable.

The four ejector pillars 22 are positioned in assembly at the corners between end plate 14 and core back-up plate 20 to define thereby a space 38. The sleeves are preferably of cylindrical configuration and are coaxially disposed with respect to the securing and aligning subassemblies 26.

Situated within the space 38 are preferably a pair of ejector plates 24, although it should be understood that any desired number of plates could be utilized as desired. The ejector plates 24 are retained in assembly with the mold base in any suitable manner as for example, by a conventional ejector yoke assembly (not shown) in a well-known manner. Ejector plates 24 (FIG. 2) consist of square plates with notched corners forming thereby a main body portion 40 and four tab portions 42 extending from the main body portion. The four tab portions 42 terminate at their edges 42a and 42b. The edges 42b of two adjacent tab portions 42 define the notch through which the ejector pillars 22 extend. In this way, the tabs 42 extend between each pair of pillars 22 with their edges *42a* parallel to the respective edges of the plates 12, 14, 16, 18 and 20, which in turn are brought into parallel alignment by the subassemblies 26.

To assemble the mold base, the securing and aligning subassemblies 26 are inserted through the respective bores 36 of the plates 12, 14, 16, 18 and 20, along with inserting the four ejector pillars 22 coaxially with the subassemblies 26 and between end plate 14 and the core back-up plate 20. Details of the subassemblies 26 are disclosed in German PAT., No. 1,265,390.

By way of summary, the subassemblies 26 include a guide bushing 44, a guide pin 46 and two guide screws 48 and 50.

The guide bushings 44 extend from core plate 18 to end plate 14. The core plate 18 is provided within bore 36 with a shoulder 52 against which a flange 54 of the guide bushing 44 is engaged. To retain the flange 54 in engagement with the shoulder 52 and plates 14, 18 and 20 in assembly with the ejector pillars 22, guide screws 50 are threadedly engaged with the guide bushings 44.

The mold plate 16 is provided within bore 36 with a shoulder 56 against which a flange 58 of the guide pins 46 is engaged. End plate 12 and mold plate 16 are therefore retained in assembly together by the guide pins 46 and guide screws 48 which are in threaded engagement with a shank portion 60 of the guide pins 46. The guide pins 46 are also provided with centering studs 62 which are inserted within the guide bushings 44 to thereby effect the desired alignement of the mold cavity portions disposed within mold plate 16 and core plate 18, as described in the above referenced patent.

Referring now to FIG. 4 which shows a typical mold cavity pattern, according to the present invention with an outline of the ejector plate superimposed thereon, it will be appreciated that parts A, B, C and D of the cross-sectional area of the mold base 10, which corresponds to the surface area of plate 16 and the core plate 18, can be more effectively utilized so that additional mold cavities can be accommodated in the mold plates through the utilization of an optimized ejector plate design.

The optimized ejector plate design requires that the securing and aligning subassemblies are confined to the corner areas defined by the ejector plate tab edges *42b* and the aligned corner edges 64 and 66 of the plates 12, 14, 16, 18 and 20. The tabs 42 can then occupy the space between the adjacent pairs of confined subassemblies 26 so that the necessary mold cores can be accommodated by the ejector plate.

With the mold cavity pattern show in FIG. 4, the mold base 10 could be connected to an injection molding machine, such as the above-mentioned "Arburg Allrounder 150", so that either ingate 68, 70, 72 or 74 is in position for forming a mold in its respective mold cavity.

In summary, the synergistic effect achieved by the combination in a mold base of square plate components, confined securing and aligning subassemblies, which leave free substantially the entire remaining surface area defined by the square plates, square ejector plates with tap portions occupying substantially the entire surface area defined by the square plates and left unoccupied by the subassemblies, results in an optimized mold base design.

It will be understood that the above description of the present invention is susceptible to various modifications, changes and adaptations and the same are intended to be comprehended within the meaning and range of equivalents of the appended claims.

I CLAIM:

1. A mold base comprising, in combination:

a. two aligned, square end plates which are spaced apart in the direction of the length of the mold base;

b. a set of aligned, square coacting mold plates arranged between said end plates, said mold plates being, in mold-closed position, spaced from one of said end plates considered in the direction of said length; said mold plates having a plurality of mold cavities therein, each having an ingate, said ingates extending to different edges of said mold plates, respectively;

c. four aligning means each extending throughout the entire length of said mold base, said aligning means passing through said plates only in the regions of the four aligned corners of said plates, respectively, and leaving free substantially the entire remainder of the cross-sectional area of the mold base;

d. a pair of ejector plates arranged in the space between said set of mold plates and one of said end plates for movement in the direction of said length, each said ejector plate comprising a body portion and a plurality of tab portions extending therefrom; said body portion and said plurality of tab portions of each ejector plate occupying substantially the entire cross-sectional area of the mold base defined by said square plates and left unoccupied by said aligning means; and e. a plurality of studs extending from the other of said end plates and arranged with respect to each other so that the mold base can be connected to an injection molding machine in a plurality of different positions, each position corresponding with the utilization of a different one of said mold cavities.

2. A mold base as defined in claim 1, further comprising means for spacing said one of said end plates and said mold plates.

3. A mold base as defined in claim 2, wherein said means for spacing includes four sleeves each concentrically disposed with one each of said four aligning means.

4. A mold base as defined in claim 1, wherein four positions comprise said plurality of different positions.

* * * * *